(12) United States Patent
Suzuki et al.

(10) Patent No.: US 6,396,394 B1
(45) Date of Patent: May 28, 2002

(54) DISPLAY APPARATUS FOR VEHICLE

(75) Inventors: Koji Suzuki; Koichi Shimamura; Koji Kano; Masanori Aoki; Hidetoshi Miyazaki, all of Wako (JP); Robert Scott Reif, Torrance, CA (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/534,748

(22) Filed: Mar. 24, 2000

(30) Foreign Application Priority Data

Mar. 26, 1999 (JP) .......................... 11-084508

(51) Int. Cl.[7] .............................................. B60Q 1/00
(52) U.S. Cl. .................... 340/425.5; 340/427; 340/438; 340/458; 340/825.31; 340/825.34
(58) Field of Search .............................. 340/425.5, 427, 340/432, 438, 439, 457, 458, 825.3, 825.31, 825.32, 825.34

(56) References Cited

U.S. PATENT DOCUMENTS 5,949,345 A * 9/1999 Beckert et al. ........ 340/815.41

FOREIGN PATENT DOCUMENTS

| DE | 19507997 A1 | 12/1996 |
| DE | 19757564 A1 | 1/1999 |
| JP | 448655 | 8/1992 |

* cited by examiner

Primary Examiner—Daryl Pope
(74) Attorney, Agent, or Firm—Birch, Stewart, Kolasch & Birch, LLP

(57) ABSTRACT

To achieve efficient utilization of a display apparatus installed in a motorcycle. Various information is displayed in accordance with an operation of an operation switch set on an information display screen provided below a speedometer. Upon operation of switching a power supply on, an opening ceremony display is displayed. However, upon operation of switching the power supply off, an ending ceremony display is displayed. By displaying vehicle owner information particularly together with the opening ceremony display, a satisfactory feeling of the owner can be obtained.

20 Claims, 10 Drawing Sheets

DISPLAY APPARATUS FOR VEHICLE

BACKGROUND OF THE INVENTION

1. Field of the Invention

The present invention relates to a display apparatus for a vehicle. More particularly, the present invention relates to a display apparatus for a vehicle which is suitably installed in a motorcycle to achieve an increase in value of the motorcycle as a product.

2. Description of the Related Art

A display apparatus for displaying information required by a driver has been provided on a vehicle. In recent years, contents displayed have been diversified by increasing the performance of a microcomputer or a liquid crystal display apparatus. For example, a maintenance timing display apparatus is disclosed in the official gazette of Japanese Patent Publication No. Hei 4-48655, wherein a running time or distance is detected and a result of the detection is compared with maintenance contents information set in advance to display maintenance timing information.

In a conventional display apparatus, as disclosed in the official gazette mentioned above, a comparatively great number of kinds of information which is useful for running of the vehicle has been displayed. However, information other than information which directly relates to an operation condition of a vehicle, such as information regarding a condition of an engine or the environment has not been displayed at all. Accordingly, it cannot be considered that utilization of a display apparatus has thus far been satisfactory.

SUMMARY OF THE INVENTION

It is an object of the present invention to provide a display apparatus for a vehicle which solves the subject described above and makes it possible to display information which has not conventionally been displayed so that a function of the display apparatus can be utilized sufficiently.

In order to attain the object described above, the present invention has the following characteristics:

(1) The present invention comprises storage means for storing vehicle owner information, an operation starting message and an operation ending message. The display means displays the vehicle owner information and the operation starting message when an operation for switching on the power supply to the vehicle is performed and displays the vehicle owner information and the operation ending message when an operation for switching off the power supply to the vehicle is performed.

(2) The present invention comprises inputting means for inputting the vehicle owner information.

(3) The present invention comprises storage means for storing an emblem regarding the vehicle. The display means displays the emblem before the vehicle owner information and the operation starting message are displayed.

(4) The present invention comprises means for setting whether or not each of the displays should be performed. Whether or not each of the displays should be performed can be selected arbitrarily.

(5) Audio information is displayed as a normal display following each of the displays.

(6) Audio information and suspension adjustment information are selectively displayed as a normal display following each of the displays.

(7) Inputting means for inputting the vehicle owner information includes an inputting screen and is constructed so as to pass through a plurality of screen changing over steps in order to pass from an initial display screen, which is displayed when the power supply is switched on, to the inputting screen.

According to the characteristics described above, using a display apparatus provided on a vehicle, vehicle owner information, an operation starting message, an operation ending message and so forth can be displayed as information which does not directly relate to an operation condition of the vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
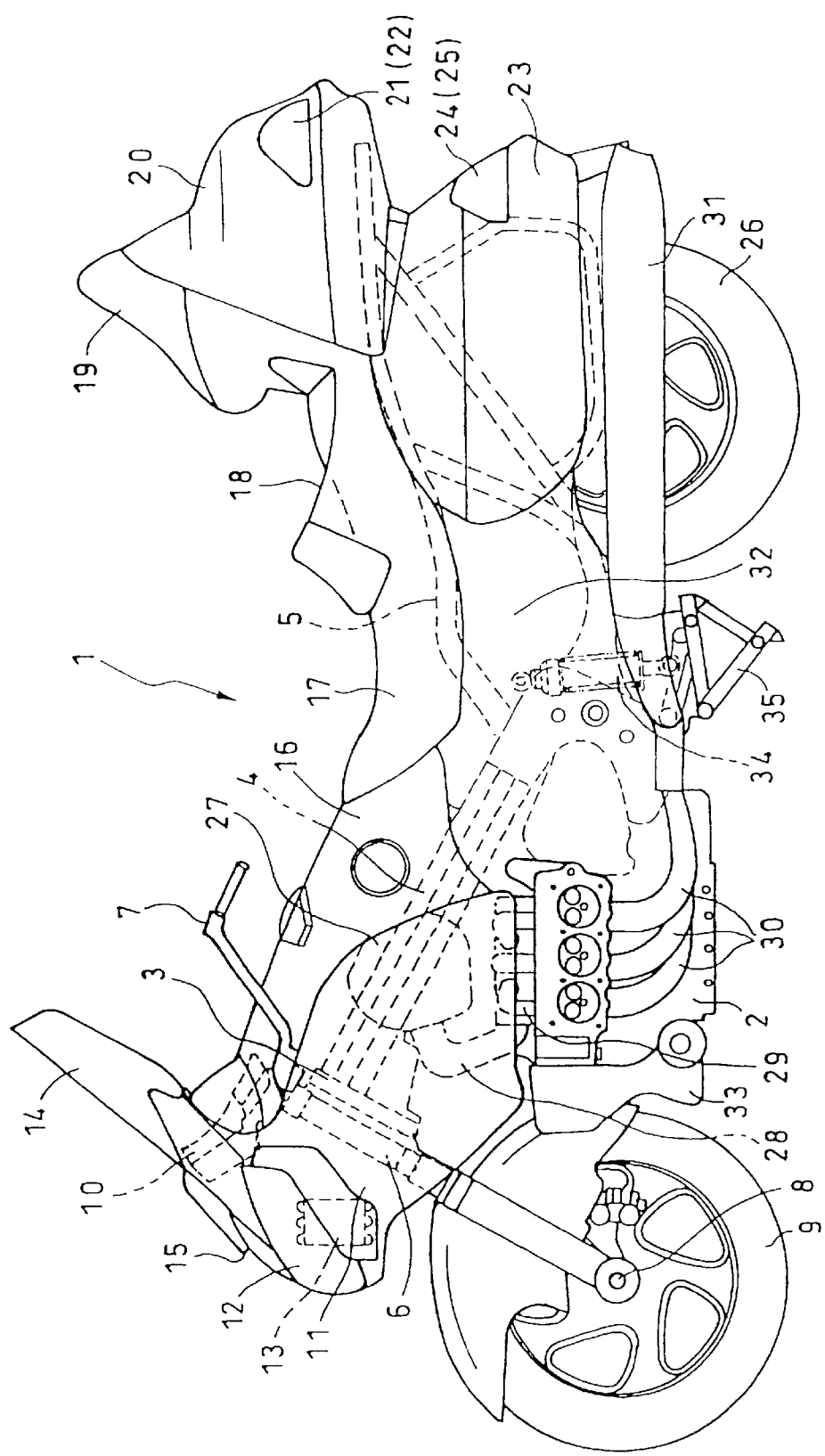
FIG. 2 is a side elevational view of the motorcycle in which the display apparatus according to the embodiment of the present invention is installed.

In the following, the present invention is described with reference to the drawings. It is to be noted that, in the following description, like or equivalent portions are denoted by like reference symbols. FIG. 2 is a side elevational view showing an appearance of a motorcycle in which a display apparatus according to an embodiment of the present invention is installed. Referring to FIG. 2, the motorcycle (hereinafter referred to as "vehicle") 1 has a horizontal opposed type six-cylinder engine 2 installed therein. A frame structure of the vehicle is composed of a main frame 4 of the twin frame type extending rearwardly of the vehicle from a steering head 3, in a bifurcated form and a rear frame 5 coupled to and extending rearwardly from the main frame 4. A front fork 6 formed from two pipes disposed on the left and the right in a running direction is provided for pivotal motion in a steering direction on the steering head 3. A handle bar 7 is secured to an upper portion of the front fork 6, i.e., a top bridge. Furthermore, a front wheel 9 is supported for rotation on a front wheel axle 8 provided at a lower end of the front fork 6.

A meter unit 10 composed of a display panel and a control section is provided forwardly of the handle bar 7. A lens wall (clear lens) 12 of a lighting system is mounted forwardly of a front fairing (cowl) 11 which covers a front portion of the vehicle 1. A boosting apparatus (ballast) 13 for a discharge lamp used as a lighting apparatus is accommodated in the front cowl 11. A windscreen 14 is provided above an upper portion of the front cowl 11, and an air inlet port 15 is formed in the proximity of a portion of the front cowl 11 at which the windscreen 14 is mounted.

A fuel tank 16 is provided on the main frame 4, and a driver's seat 17 and a passenger's seat 18 carried on the rear frame 5 are disposed rearwardly of the fuel tank 16. The passenger's seat 18 is formed integrally with the driver's seat 17 and has a backrest 19. A rear trunk 20 is provided in a rear portion of the backrest 19. Rear stop lamps 21 and blinker lamps 22 are provided at rear portions of the rear trunk 20. A pair of side trunks 23 are provided on the left and right of a rear wheel 26 below the rear trunk 20, and another set of rear stop lamps 24 and blinker lamps 25 are provided at rear portions of the side trunks 23.

An air cleaner 27 is provided forwardly below the fuel tank 16, and a pair of intake manifolds 29 extend from a throttle body 28 provided forwardly of the air cleaner 27. Each of the intake manifolds 29 is coupled to three cylinders disposed in an opposed relationship to each other on the left and the right of the vehicle body, and a fuel injection apparatus (not shown) is disposed on the upstream of each of the cylinders. Exhaust manifolds 30 extend rearwardly from the engine 2. The exhaust manifolds 30 are connected to a muffler 31.

It is to be noted that the opposite sides below the driver's seat 17 are covered with side covers 32, and a front lower cowl 33 is disposed forwardly of the engine 2. Furthermore, a rear cushion 34 is provided below the driver's seat 17. The rear cushion 34 is coupled to a hydraulic unit (not shown) which can be electrically operated to adjust a spring force thereof to adjust the initial load of the suspension in accordance with the weight of a driver. The vehicle 1 can stand up using a stand 35.

Figure 1:
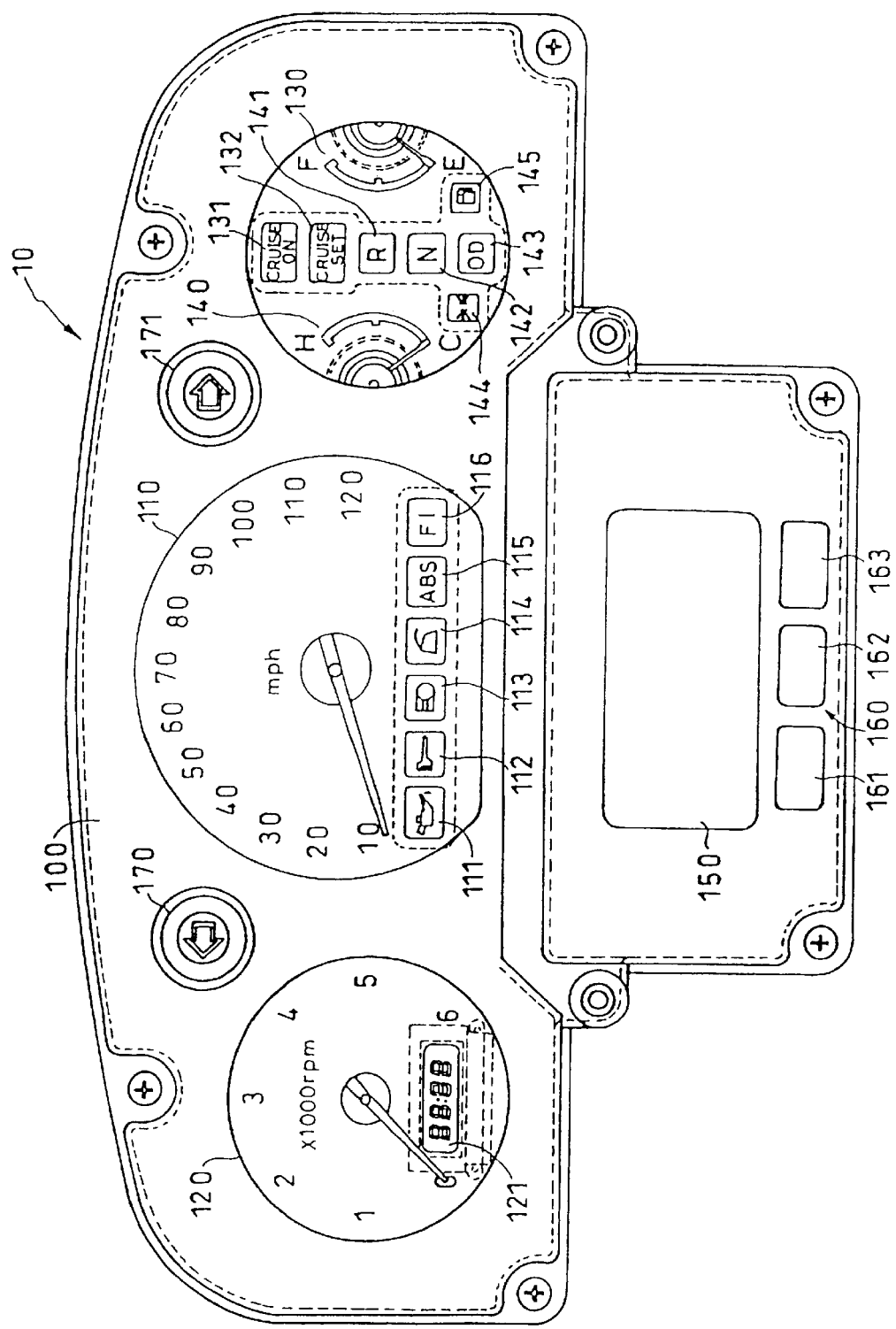
FIG. 1 is a top plan view of a meter unit of a motorcycle which includes a display apparatus according to an embodiment of the present invention.

A display panel of the meter unit 10 described above will now be described. FIG. 1 is a plan view of the meter unit as viewed from the driver's seat side of the motorcycle. Referring to FIG. 1, a speedometer 110 is provided at a central portion of a display panel 100, and a tachometer 120 is disposed on the left of the speedometer 110, while a fuel-gauge 130 and a water temperature gauge 140 are disposed on the right of the speedometer 110. An information display screen 150 and an operation switch set 160 for the information display screen 150 are provided below the speedometer 110.

In the speedometer 110, an oil indicator 111, an immobilizer (burglary prevention) indicator 112, a high beam indication lamp 113, a trunk lock indicator 114, an ABS (antilock brake system) warning lamp 115 and an FI (fuel injection) warning lamp 116 are disposed together. Furthermore, between the fuel-gauge 130 and the water temperature gauge 140, an auto-cruise indication lamp 131 and an auto-cruise set indication lamp 132 as well as a reverse indication lamp 141, a neutral indication lamp 142 and an overdrive indication lamp 143 for a speed change gear are disposed in a vertical column. Furthermore, a light on/off indicator 144 is disposed on the left side and a fuel empty indicator 145 is disposed on the right side, of the indicator lamps 143 of the speed change gear.

The operation switch set 160 of the information display screen 150 includes a mode switch 161, a trip switch 162 and a display switch 163. Display contents for the information display screen 150 by operations of the switches 161 to 163 are hereinafter described in detail. It is to be noted that a clock 121 is provided at a lower portion of the tachometer 120, and blinker indicators 170, 171 are provided on the left and the right above the speedometer 110.

Figure 3:
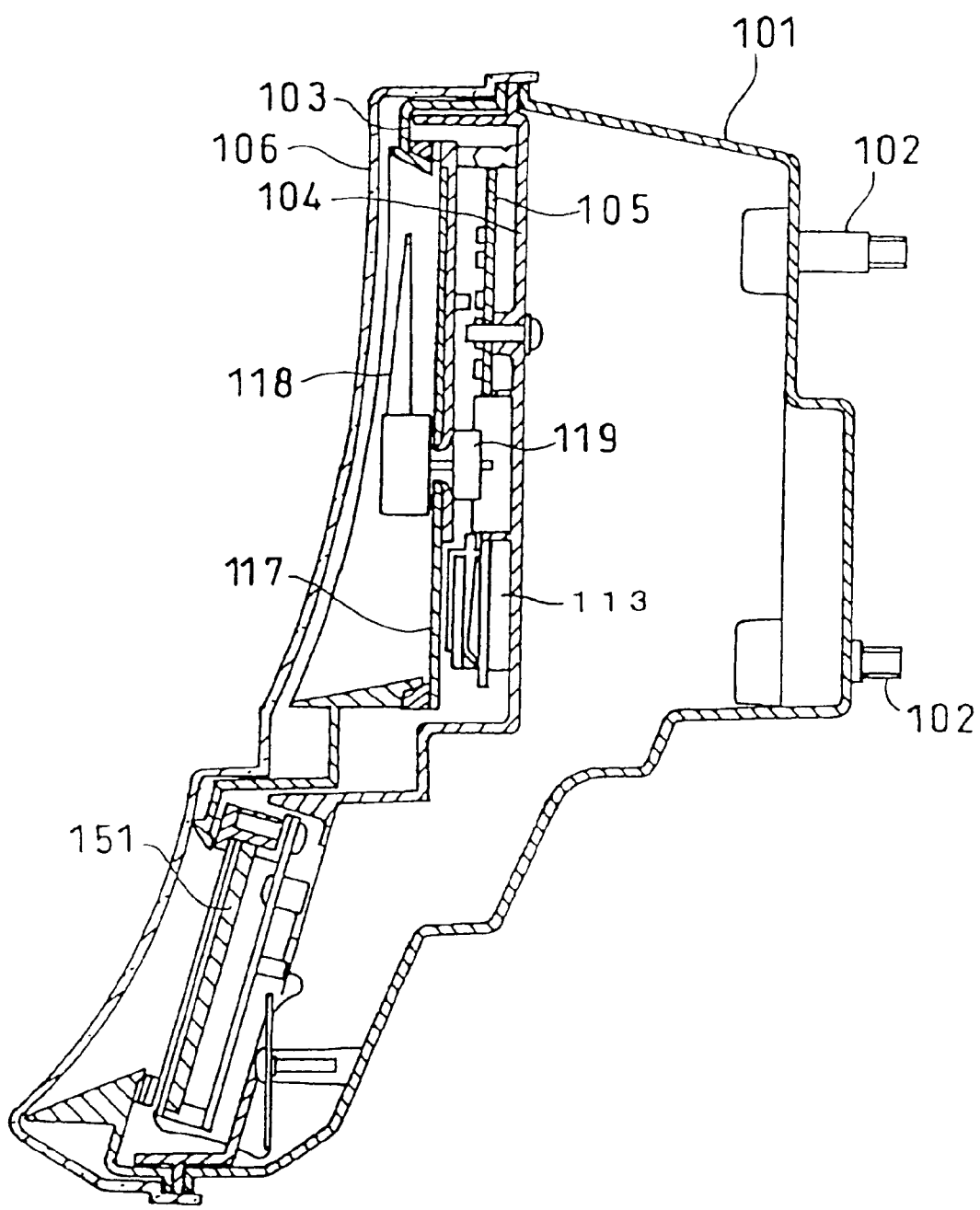
FIG. 3 is a sectional view of the meter unit.

FIG. 3 is a sectional view showing a structure of the meter unit 10. Referring to FIG. 3, bolts 102 are implanted on a lower casing 101, and the meter unit 10 is secured to the front cowl 11 described above using the bolts 102. An upper casing 103 is provided on a front face of the lower casing 101, and an inner casing 104 is held between the lower casing 101 and the upper casing 103. A dial 117 of the speedometer 110 and a liquid crystal panel 151 as a body of the information display screen 150 are held between the inner casing 104 and the upper casing 103.

A shaft of a pointer 118 extends through the dial 117, and a driving section 119 of the pointer 118 and an indicator (in FIG. 3, the high beam indication lamp 113) as well as a control circuit board 105 are disposed between the dial 117 and the inner casing 104. A lens 106 of an acrylic resin is provided in front of the meter unit 10 in order to protect the components.

Figure 4:
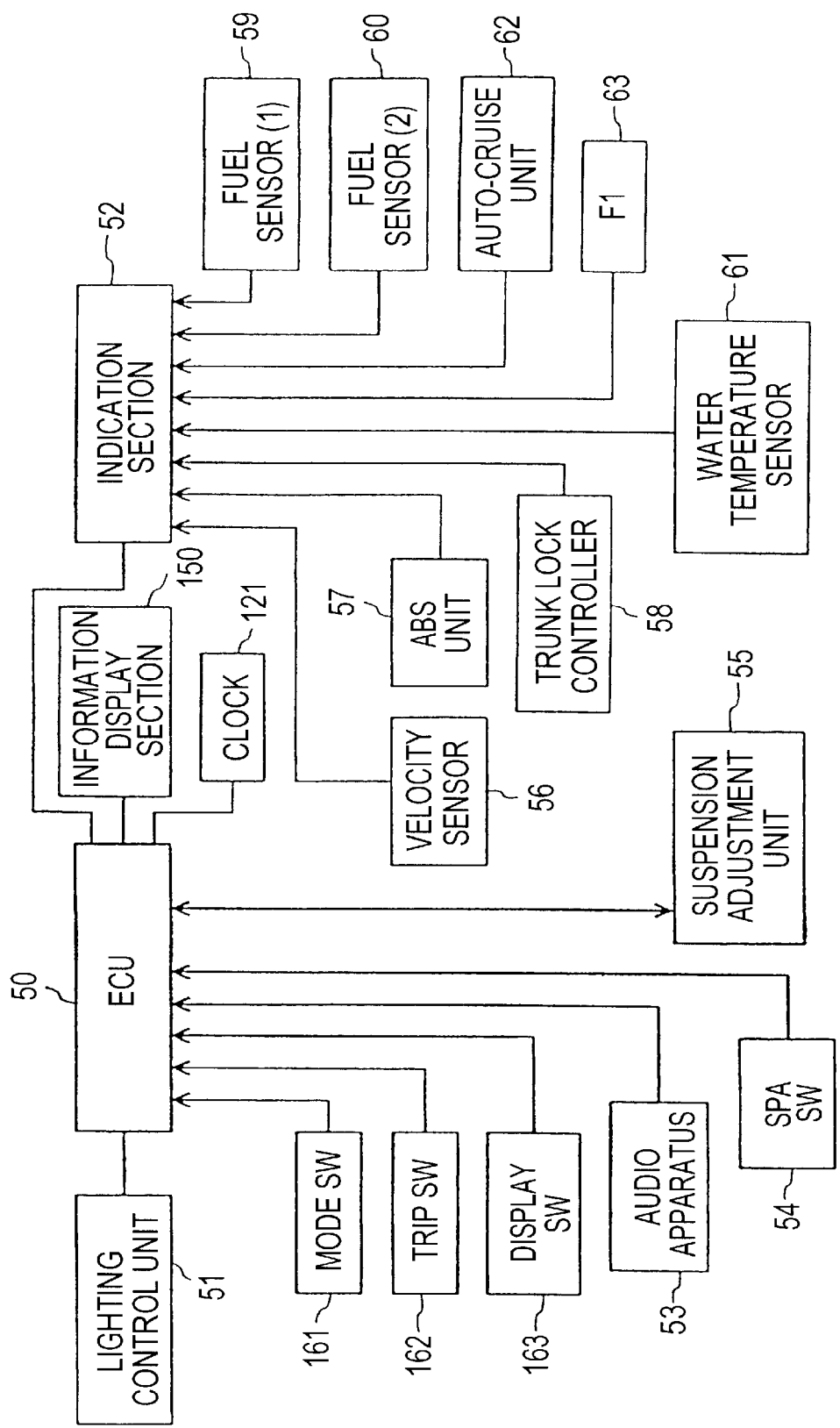
FIG. 4 is a connection diagram of a control section of the meter unit.

Connection of the control section of the meter unit 10 will now be described. FIG. 4 is a connection diagram of the control section. A lighting control section 51 for performing light adjustment of the meter unit 10, an information display section (screen) 150, the clock 121 and an indicator section 52 are connected to an ECU 50 provided in the meter unit 10. The indicator section 52 includes the above-described indicators, warning lamps and so forth which indicate an operation condition of the engine, a running condition and so forth. The lighting control section 51 includes a sensor for detecting the luminance of the lighting.

The ECU 50 accepts detection signals from the mode switch 161, the trip switch 162, the display switch 163, an audio apparatus 53, a suspension adjustment (SPA) switch 54 and so forth to perform predetermined processing and outputs control signals to the indicator section 52, the information display section 150 and so forth. The construction of an electrically operated suspension adjustment unit 55 by the suspension adjustment switch 54 will now be described.

The ECU 50 includes memory means for storing data for an operation starting message (opening ceremony display) and an operation ending message (ending ceremony display) and vehicle owner information, i.e., data representative of a vehicle owner. The vehicle owner information can be updated arbitrarily by operating the mode switch 161, the trip switch 162, the display switch 163 and so forth.

Detection signals from a velocity sensor 56, an ABS unit 57, a trunk lock controller 58, fuel sensors 59, 60, a water temperature sensor 61, an auto-cruise unit 62 and a fuel injection system 63 are inputted into the indicator section 52. Furthermore, the indicator section 52 performs a display or warning based on the input signals. It is to be noted that one of the fuel sensors 59, 60 is provided to detect a remaining amount of fuel as a trigger for measurement of a reserve distance (hereinafter described).

Figure 5:
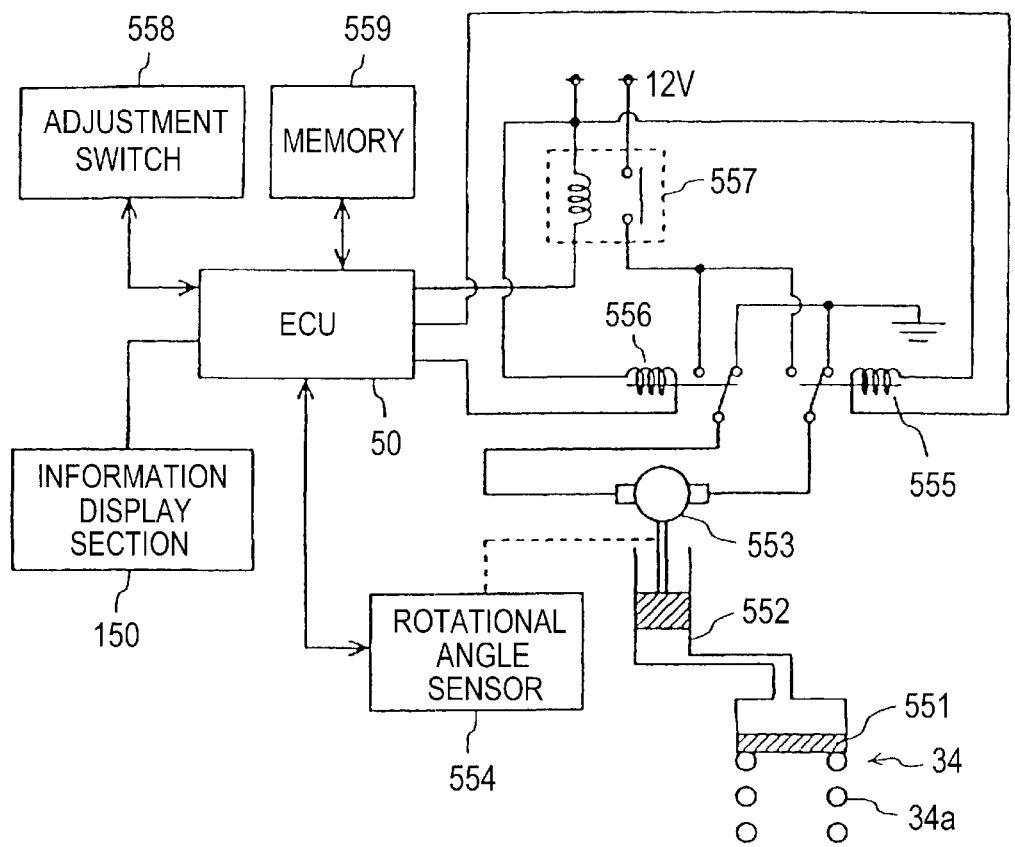
FIG. 5 is a construction diagram of a suspension adjustment unit.

FIG. 5 is a view showing a construction of the suspension adjustment unit. Referring to FIG. 5, hydraulic pressure is applied by oil supplied from a hydraulic jack 552 to a piston 551 engaged with an end portion of a spring 34a of the rear cushion 34. The hydraulic jack 552 is driven by a motor 553, and a driven amount of the hydraulic jack 552 is detected by a rotational angle sensor 554 and is used for control. The direction of rotation of the motor 553 is controlled by switching of relays 555, 556. The relays 555, 556 are connected to a power supply (12 V) through a main relay 557.

If an engine key is operated to an "ACC" position, then the main relay 557 is turned on and the relays 555, 556 are enabled for operation. Thus, if an adjustment switch 558 is switched to the load increasing side or the load decreasing side, then the relay 555 or 556 is turned on and the motor 553 is driven. As a result, the hydraulic pressure to be applied to the piston 551 of the real cushion 34 is varied by the hydraulic jack 552. By the variation of the hydraulic pressure, the pre-load applied to the spring 34a of the rear cushion 34 is varied. The operation of the adjustment switch 558 can be performed while information (details of which are hereinafter described) of the information display section 150 is confirmed. A result of the adjustment can be stored into a memory 559, and the stored data can be read out to set the pre-load by the driver.

Subsequently, displaying processing of the information display screen (hereinafter referred to simply as "screen") by operations of the operation switches 161 to 163 described hereinabove will be described with reference to the drawings. FIGS. 6 to 20 show display examples of the information display screen. Following an opening ceremony display which is hereinafter described, a normal display which displays audio information appears on the screen 150. If one of the operation switch set 160 is operated on the audio information display screen, then a normal display for setting appears. While the normal display screen is not shown, characters of a mode "MODE", a trip "TRIP" and a display "DISPLAY" are displaced corresponding to the switches 161 to 163 of the operation switch set 160 on the screen 150.

Figure 6:
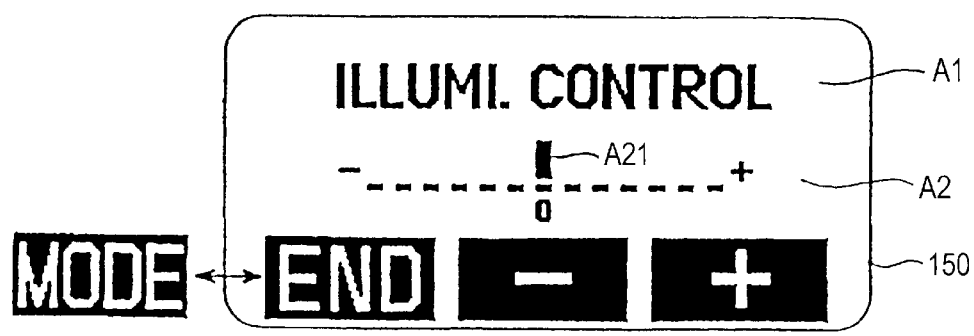
FIG. 6 is a view showing a first display example of an information display screen.

If the mode switch 161 is operated to be turned on in the normal display, then the mode changes over to a display brightness setting mode. FIG. 6 shows an example of a display of the display brightness setting mode. In the brightness setting mode, the displays corresponding to the switches of the screen 150 change over to "END", "−" and "+", and characters A1 of "ILLUMI. CONTROL" indicating the brightness setting mode and an indicator A2 of the degree of brightness. It is to be noted that a bar A21 of the indicator A2 moves between "+" and "−" in accordance with the setting of the brightness.

If the trip switch 162 is operated in the brightness setting mode described above, then corresponding to the "−" display on the screen, the brightness of the screen 150 decreases in accordance with the number of times of operations of the trip switch 162. On the other hand, if the display switch 163 is operated, then corresponding to the "+" display on the screen, the brightness of the screen 150 increases in accordance with the number of times of operations of the display switch 163. If the mode switch 161 on which "END" is displayed on the screen is depressed or no switch operation is performed for a predetermined time (for example, 5 seconds), then the setting of the brightness is settled, and the normal display is restored.

Figure 7:
FIG. 7 is a view showing a second display example of the information display screen.

FIG. 7 shows an example of a display of an automatic light adjustment setting mode. If the mode switch 161 is operated successively twice on the normal display described above, then the mode changes over to an automatic light adjustment setting mode, i.e., a mode for setting whether or not the display brightness should be adjusted automatically. Then, the displays corresponding to the switches of the screen 150 change over to "END" and "ON/OFF", and characters B1 of "ILLUMI. MODE" indicating the automatic light adjustment mode and characters B2 "AUTO:ON (OFF)" indicating on/off of the automatic light adjustment mode are displayed.

If the trip switch 162 is operated in the automatic light adjustment mode, then corresponding to the "ON/OFF" display on the screen, characters of ON and OFF of the characters B2 alternately change over for each operation. If the mode switch 161 is depressed when the characters B2 indicate a desired one of ON and OFF or no switch operation is performed for a predetermined time (for example, 5 seconds), then the setting is settled, and the normal display is restored.

Figure 8:
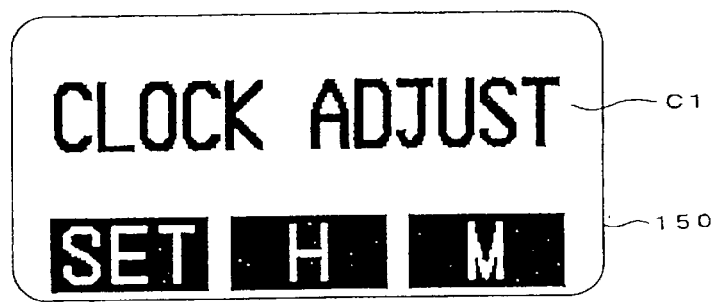
FIG. 8 is a view showing a third display example of the information display screen.

FIG. 8 is an example of a display of a clock adjustment mode. If the mode switch 161 is operated successively three times on the normal display, then the mode changes over to a clock adjustment mode. The displays corresponding to the switches of the screen 150 change over to "SET", "H" and "M", and characters C1 of "CLOCK ADJUST" indicating the clock adjustment mode are displayed.

If the trip switch 162 is operated in the clock adjustment mode, then corresponding to the "H" display on the screen, the hour display of the clock 121 varies in accordance with the number of times of operations. Furthermore, if the trip switch 162 is kept depressed for a long time (for example, more than 2 seconds), then the hour display of the clock 121 varies fast. On the other hand, if the display switch 163 is displayed, then corresponding to the "M" displays on the screen, the minute display of the clock 121 varies in accordance with the number of times of operations of the display switch 163. If the trip switch 162 is kept depressed for a long time, then the minute display of the clock 121 varies fast. If the mode switch 161 is depressed when a desired time is displayed, then the clock display is settled, and the normal display is restored.

Figure 9:
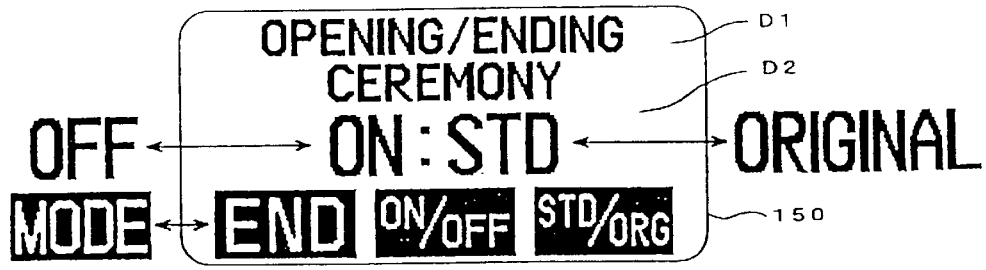
FIG. 9 is a view showing a fourth display example of the information display screen.

FIG. 9 shows an example of a display of a ceremony setting mode. If the mode switch 161 is operated successively four times on the normal display, then the mode changes over to a ceremony setting mode. In the present embodiment, by operating the mode switch 161 to switch on by a number of times in this manner, the mode changes over to the ceremony setting mode. The reason why a number of times of switching-on operations are required in this manner is that it is intended to prevent setting of a message for a ceremony from being carried out readily by simple operation of the mode switch 161 by a third party. In the ceremony setting mode, the displays corresponding to the switches of the screen 150 change over to "END", "ON/OFF" and "STD/ORG", and characters D1 of "OPENING/ENDING CEREMONY" indicating the ceremony setting mode and characters D2 of ON(OFF):STD(ORG) indicating which one of the standard and the original is selected are displayed.

If the trip switch 162 is operated in the ceremony setting mode, then corresponding to the "ON/OFF" display on the screen, the characters of ON and OFF of the characters D2 change over alternately in response to the operation. On the other hand, if the display switch 163 is operated, the characters of STD and ORG of the characters D2 change over alternately in response to the operation. If the mode switch 161 is depressed when the characters D2 indicate desired characters or no switch operation is performed for a predetermined time (for example, 5 seconds), then the setting is settled, and the normal display is restored.

If the setting is set to "ON" in the ceremony setting mode, then a predetermined opening ceremony display is displayed in response to a switching on operation of the power supply. However, a predetermined ending ceremony display is displayed in response to a switching off operation of the power supply. On the other hand, if the setting is set to "OFF", then none of the ceremony displays is performed. Furthermore, if the setting is set to "STD", then a standard ceremony display set in advance is displayed. However, if the setting is set to "ORG", then a ceremony display inputted uniquely by the owner of the vehicle 1 is displayed. Since a ceremony display is displayed or not displayed or it can be selected whether a standard ceremony display should be displayed or an original ceremony display should be displayed by arbitrary selection of the owner in this manner, various favorites can be satisfied.

Figure 10:
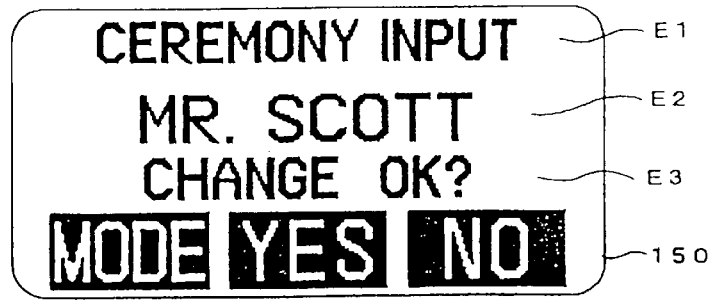
FIG. 10 is a view showing a fifth display example of the information display screen.
Figure 11:
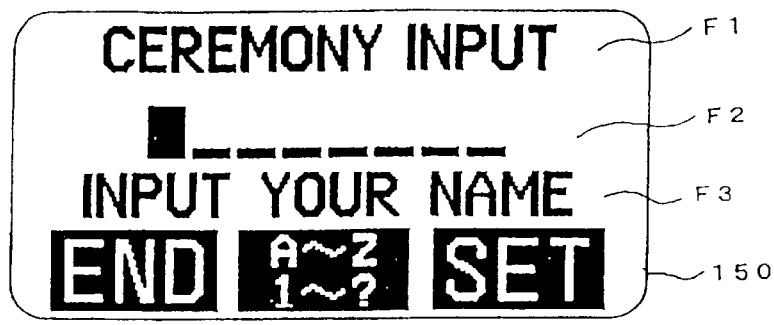
FIG. 11 is a view showing a sixth display example of the information display screen.
Figure 12:
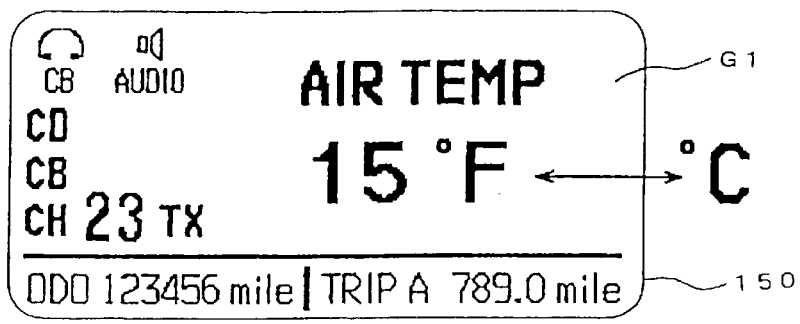
FIG. 12 is a view showing a seventh display example of the information display screen.

FIGS. 10 and 11 show examples of a display of a ceremony input mode. If the mode switch 161 is operated successively five times on the normal display, then the mode changes over to a ceremony input mode. Then, as shown in FIG. 10, the displays corresponding to the switches of the screen 150 change over to "MODE", "YES" and "NO", and characters E1 of "CEREMONY INPUT" indicating the ceremony input mode, characters E2 indicating a name set at present and characters E3 of "CHANGE OK?" of inquiring whether or not updating should be performed are displayed.

If the mode switch 161 or the display switch 163 is operated in the display condition of FIG. 10, then the normal display is restored, but if the trip switch 162 is operated, then the intent to change the setting of the ceremony display is recognized, and the characters E2 and E3 of the screen 150 disappear and another ceremony input screen on which an input column F2 including a cursor and characters F3 of "INPUT YOUR NAME" for urging to input a name appears (refer to FIG. 11). Furthermore, the displays corresponding to the switches of the screen 150 change over to "END", "A~Z, 1~?" and "SET" (refer to FIG. 11).

Here, if the trip switch 162 is operated, then corresponding to the "A~Z, 1~?" display on the screen, a character or symbol or else a blank is inputted to the cursor position of the input column F2 in response to the number of times of operations. If the display switch 163 is operated when desired characters and so forth are inputted, then corresponding to the "SET" display, the characters are settled. If the mode switch 161 is operated after necessary characters are inputted and settled by the operator, then the normal display is restored.

Furthermore, if the display switch 163 is operated once on the normal display, then an external temperature G1 is displayed (refer to FIG. 12 for an example of the display), but if the display switch 163 is operated twice, then the normal display is restored. It is to be noted that, if the display switch 163 is operated successively twice (for example, within 2 seconds), then an electrically operated suspension adjustment (SPA) mode is restored (refer to FIG. 13 for an example of the display) from the external temperature display.

Figure 13:
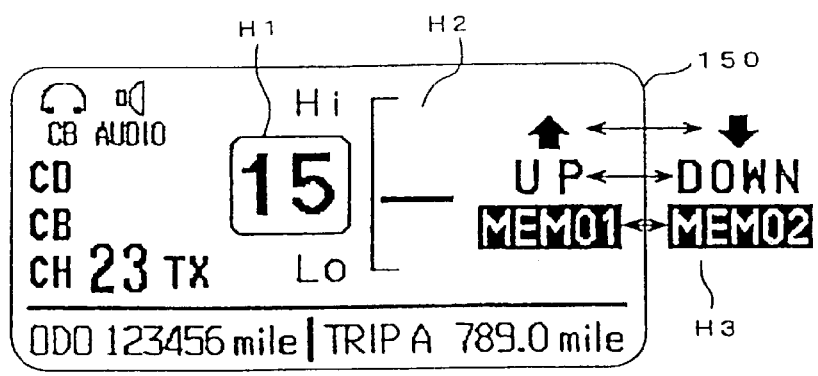
FIG. 13 is a view showing an eighth display example of the information display screen.

In the electrically operated SPA mode whose display example is shown in FIG. 13, a numeral H1 indicating a load to the suspension and an indicator H2 with a bar indicating what degree the load is as well as a distinction of a memory into which the load is to be stored and characters and so forth H3 of a direction (UP or DOWN) of the operation of the load adjustment switch are displayed. The circuit and so forth of the electrically operated SPA are described hereinabove with reference to FIG. 5. It is to be noted that an audio mode, a CB (radio) display, an odometer, a trip meter and so forth are displayed together on the screen 150 on which the external temperature display or the electrically operated SPA display is displayed.

On the trip meter mentioned above, each time the trip switch 162 is operated, trip distances "TRIP A", "TRAP B" and a reserve distance (a distance display from a point of time set in advance, for example, a travel distance display after the remaining amount of fuel becomes a predetermined value) "TRIPRES" are displayed alternately for each operation. Furthermore, if the trip switch 162 is kept depressed for a long time (for example, more than 2 seconds), then the current trip distance is reset. It is to be noted that the reserve distance is not reset by the operation.

Figure 14:
FIG. 14 is a view showing a ninth display example of the information display screen.
Figure 15:
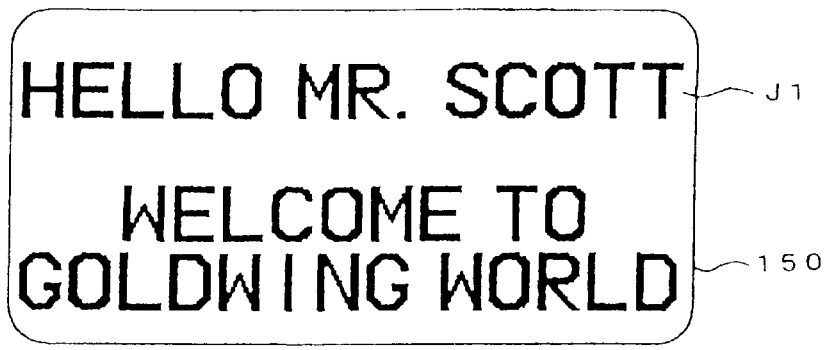
FIG. 15 is a view showing a tenth display example of the information display screen.
Figure 16:
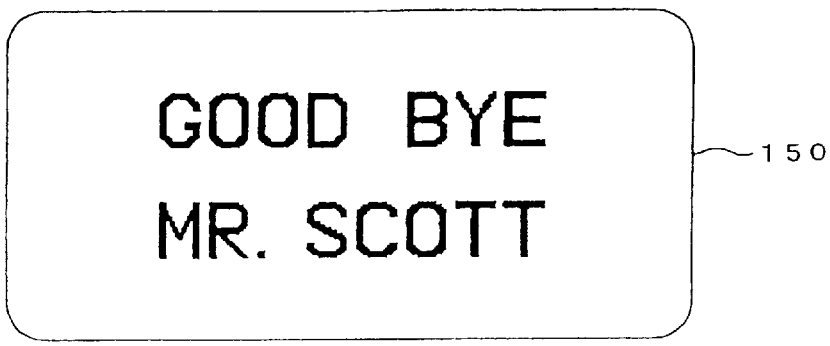
FIG. 16 is a view showing an eleventh display example of the information display screen.

A ceremony display will now be described. As described above, if the ceremony display setting is set to "OFF", then when the power supply is switched on, i.e., when the key switch is operated to the "ACC" position, the opening ceremony display is not displayed. In other words, only an odometer and a trip meter are displayed on the screen 150. On the other hand, if the ceremony display setting is set to "ON", then after the power supply is switched on, i.e., after the key is operated to its on position (ACC), the opening ceremony is displayed until a predetermined time elapses. FIG. 14 shows an example of a first screen of the opening ceremony and FIG. 15 shows an example of a second screen of the opening ceremony. On the first screen, a name of the vehicle initially set, an emblem such a logo regarding the vehicle and so forth can be displayed. Furthermore, as characters J1 of the second screen, characters "HELLO" of a greeting can be displayed together with a name (here, "MR. SCOTT") inputted in the ceremony input mode described hereinabove. For example, after the first screen and the second screen are displayed individually for 2 seconds, the normal display screen described hereinabove is restored.

On the other hand, after the power supply is switched off, that is, after the key is returned to "ACC", an ending ceremony display is given until a predetermined time (for example, 2 seconds) elapses. For example, ending greetings "GOOD BYE MR. SCOTT" to the owner of the vehicle are displayed (refer to FIG. 16). After a predetermined display time elapses, all displays disappear from the screen 150.

It is to be noted that a standard opening ceremony display or a standard ending ceremony display can be displayed as follows. For example, in the standard opening ceremony, only the emblem and so forth of FIG. 14 are displayed, but the display of FIG. 15 is not executed. On the other hand, in the ending ceremony, only characters "GOOD BYE" of a greeting which does not include a display of a name are displayed.

Figure 17:
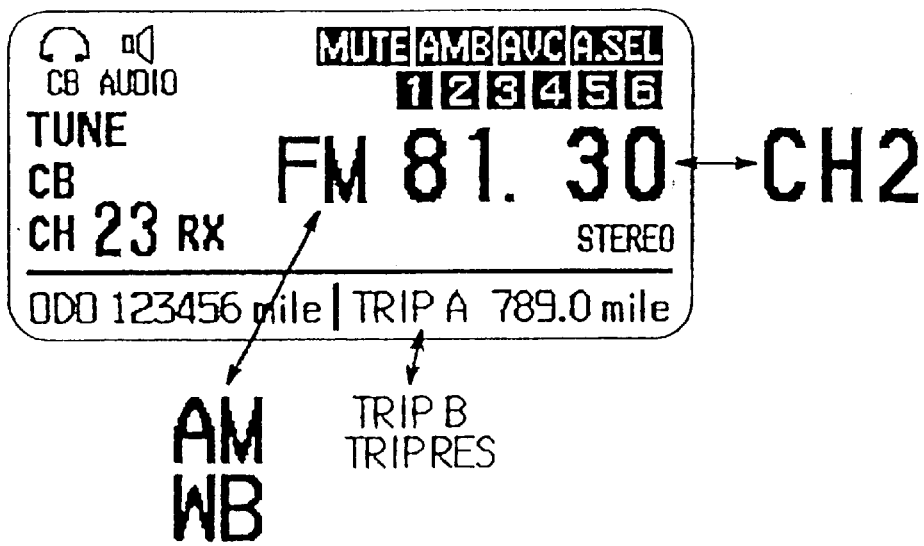
FIG. 17 is a view showing a twelfth display example of the information display screen.

An example of a display upon radio reception or the like will be described. The following audio display is displayed in accordance with an operation of an apparatus such as a radio set. When the power supply is turned on, the audio display appears following the opening ceremony display described above. FIG. 17 shows an example of a display upon radio reception, and a condition of radio reception of an audio apparatus is displayed. As an example, an FM reception frequency "FM81.30" is displayed.

Figure 18:
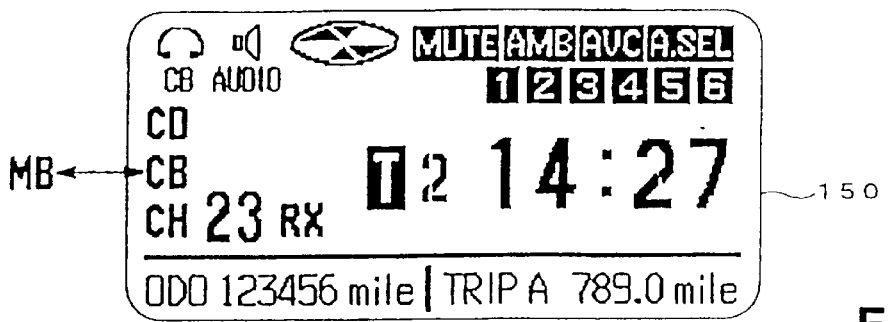
FIG. 18 is a view showing a thirteenth display example of the information display screen.

FIG. 18 shows an example of a display when a CD or MD is played. As an example, a track number and a play time "T2, 14:27" when a CD is played and a figure schematically representing a CD disk or an MD disk are displayed. It is to be noted that the schematic view of a CD disk or an MD disk can be displayed such that the pattern thereof varies so that it can be recognized readily that a CD disk or an MD disk is being played.

Figure 19:
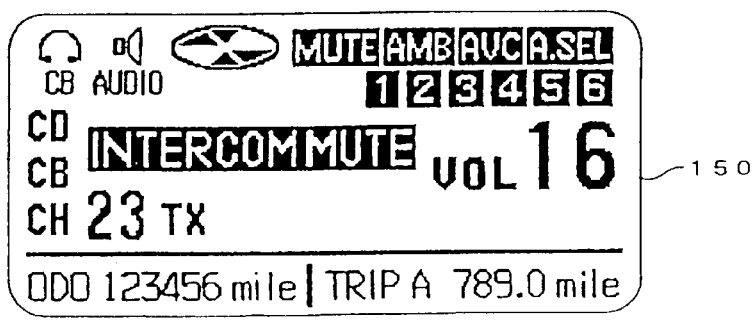
FIG. 19 is a view showing a fourteenth display example of the information display screen.

FIG. 19 shows an example of a display upon setting of the volume and so forth of an intercom (a call between a driver and a passenger), CB radio-audio. For example, characters of "INTERCOMMUTE" which are a display of an intercommute volume and characters of VOL16" indicating a sound volume upon muting are displayed. It is to be noted that the characters of "INTERCOMMUTE" change over to characters of "CB VOL" indicating a sound volume of the CB radio, characters "AUDIO VOL" indicating a sound volume when a CD is displayed, "SQUELCH VOL" indicating a squelch level, characters of "AUTO VOL SPK" indicating an automatic sound volume of a speaker, characters of "AUTO VOL HS" indicating an automatic sound volume of a head set and so forth in response to respectively corresponding settings.

Figure 20:
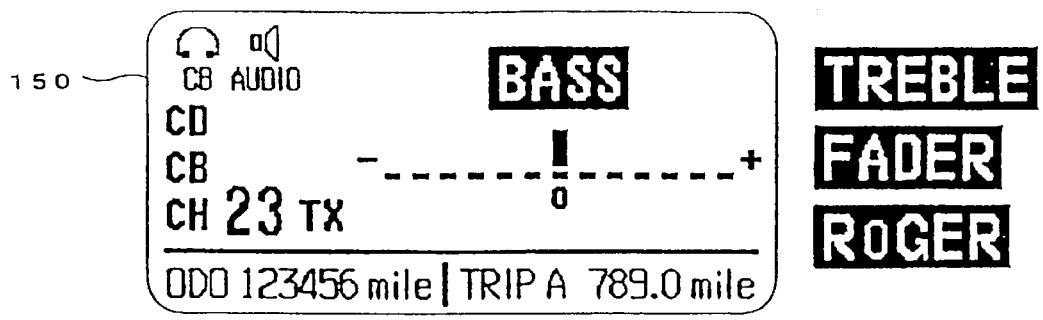
FIG. 20 is a view showing a fifteenth display example of the information display screen.

FIG. 20 shows an example of a display upon audio parameter adjustment, and an indicator for indicating the level of a bass and characters of "BASS" are displayed. The characters of "BASS" change over to characters of "TREBLE" indicating a treble level, characters of "FADER" indicating a fader level, characters of "ROGER" indicating a roger level and so forth in response to respectively corresponding settings.

It is to be noted that, upon changing over of the normal display mode, interrupt display of an audio condition or the like is not performed. Furthermore, a timing at which a display condition changes actually when each operation switch is depressed is obtained in response to switching on of the operation switch. However, where the discrimination between a depressed condition kept for a long time and a different depressed condition is required, a timing is obtained in response to switching off of the operation switch.

Furthermore, if an interruption by an audio operation occurs on the external temperature display or the electrically operated SPA display by an operation of the display switch 163, an interruption, for example, for 5 seconds is allowed.

Figure 21:
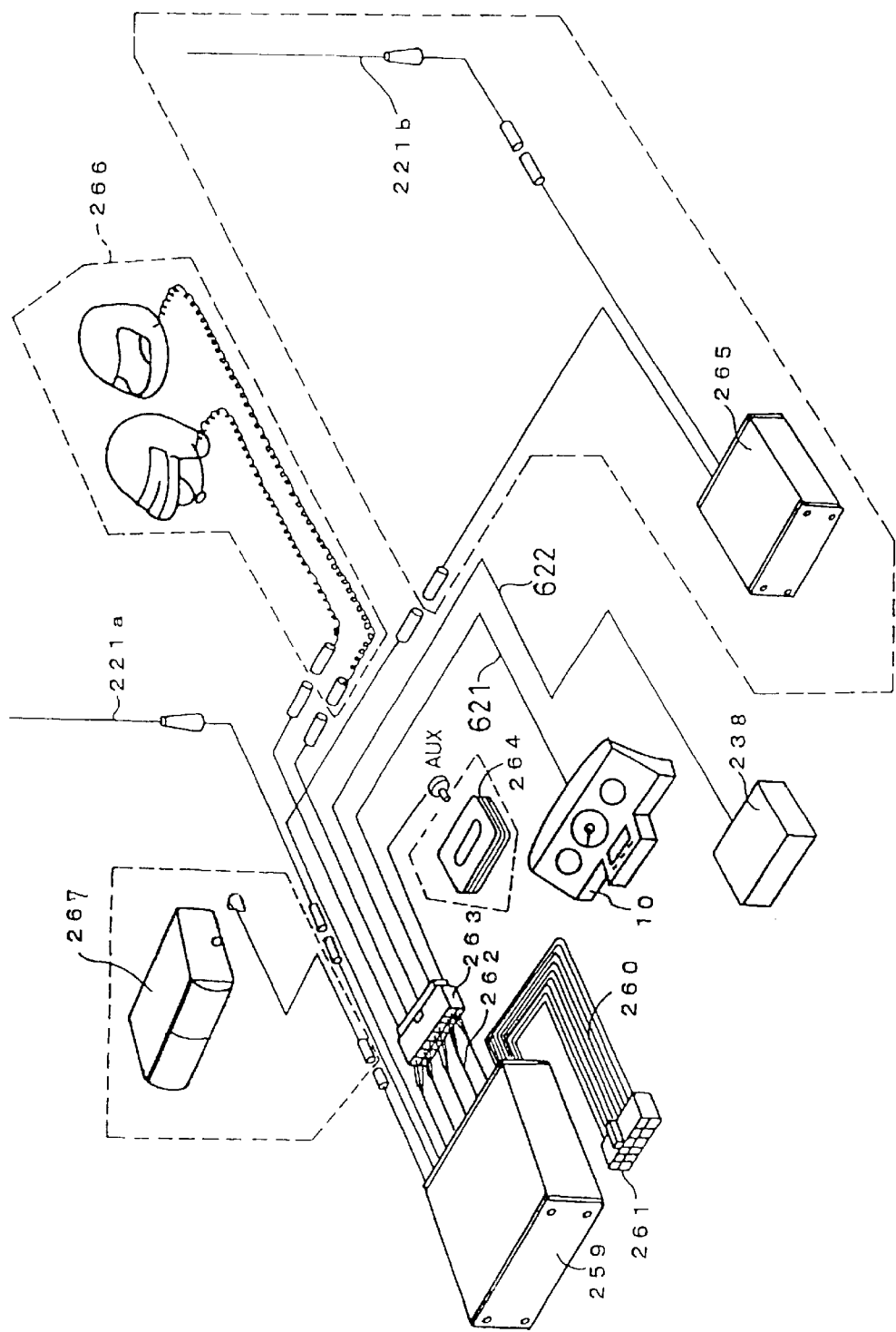
FIG. 21 is a system diagram of an audio apparatus.

A system of an audio apparatus will now described. FIG. 21 is a system diagram of an audio apparatus. A first connector 261 provided at an end of a first cable set 260 of an apparatus body 259 is connected to a harness provided on the vehicle body side. Power is supplied through the first connector 261 while a sound signal is outputted to a front speaker (not shown). It is to be noted that not only the front speaker is provided but also another speaker can be provided as a rear speaker in the proximity of the passenger's seat 18.

A second connector 263 is connected to a second cable set 262 of the apparatus body 259, and one set (621) of the second cable set 262 is connected to the meter unit 10 through the second connector 263 while the other set (622) is connected to an audio switch unit 238.

Furthermore, a handy stereo apparatus 264, a CB communication apparatus 265 and a headset 266 can be connected additionally to the apparatus body 259 through the connector 263. The headset 266 can be provided for each of a driver and a passenger and has a speaker and a microphone incorporated in a helmet. With the headset 266, a driver can talk with a passenger and can communicate with another station through the CB communication apparatus 265.

Also, a CD playing apparatus 267 can be connected to the apparatus body 259 if required. Furthermore, a radio antenna 221a is connected to the apparatus body 259, and a CB communication antenna 221b is connected to the CB communication apparatus 265. In the present audio apparatus, the audio switch unit 238 may be provided integrally with the apparatus body 259 or may be provided separately at a position where a driver can operate it readily such as on the handle bar 7. An example wherein an audio switch unit is disposed on the handle bar 7 is disclosed in the specification of Japanese Patent Application No. Hei 10-345178 filed previously by the present applicant.

As is apparent from the foregoing description, according to the present invention, information which does not relate directly to the running of a vehicle can be displayed on a display apparatus provided on the vehicle. Furthermore, efficient utilization of the display apparatus is allowed. Particularly since it is possible to display vehicle owner information, the affection of the vehicle owner to and the satisfactory feeling of one in possession of the vehicle can be enhanced. This is an effective way to increase the value of the vehicle as a product.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display apparatus for a vehicle, comprising;
    storage means for storing vehicle owner information, an operation starting message and an operation ending message; and
    display means for displaying the vehicle owner information and the operation starting message when an operation switch for switching power supply to said vehicle is turned ON, and for displaying the vehicle owner information and the operation ending message when the operation switch for switching the power supply to said vehicle is turned OFF.

2. The display apparatus for a vehicle according to claim 1, further comprising inputting means for inputting the vehicle owner information.

3. The display apparatus for a vehicle according to claim 1, further comprising storage means for storing an emblem identifying said vehicle, said display means displaying the emblem before the vehicle owner information and the operation starting message are displayed.

4. The display apparatus for a vehicle according to claim 2, further comprising storage means for storing an emblem identifying said vehicle, said display means displaying the emblem before the vehicle owner information and the operation starting message are displayed.

5. The display apparatus for a vehicle according to claim 1, further comprising means for setting whether or not each of the displays should be performed, said means for setting whether or not each of the displays should be performed being arbitrarily selectable.

6. The display apparatus for a vehicle according to claim 2, further comprising means for setting whether or not each of the displays should be performed, said means for setting whether or not each of the displays should be performed being arbitrarily selectable.

7. The display apparatus for a vehicle according to claim 3, further comprising means for setting whether or not each of the displays should be performed, said means for setting whether or not each of the displays should be performed being arbitrarily selectable.

8. The display apparatus for a vehicle according to claim 4, further comprising means for setting whether or not each of the displays should be performed, said means for setting whether or not each of the displays should be performed being arbitrarily selectable.

9. The display apparatus for a vehicle according to claim 1, wherein audio information is displayed as a normal display following each of the displays.

10. The display apparatus for a vehicle according to claim 1, wherein audio information and suspension adjustment information are selectively displayed as a normal display following each of the displays.

11. The display apparatus for a vehicle according to claim 1, wherein inputting means for inputting the vehicle owner information includes an inputting screen and is constructed so as to pass through a plurality of screen changing over steps in order to pass from an initial display screen, which is displayed when the power supply is switched on, to the inputting screen.

12. A motorcycle, comprising:
    a frame structure including a main frame and a rear frame, said rear frame extending rearwardly from and connected to said main frame;
    a front fork mounted for pivotal motion on said frame structure;
    handle bars secured to an upper portion of said front fork;
    front and rear wheels mounted for rotation on said front fork and said rear frame, respectively; and
    a display apparatus, said display apparatus including:
        storage means for storing vehicle owner information, an operation starting message and an operation ending message; and
        display means for displaying the vehicle owner information and the operation starting message when an operation switch for switching power supply to said vehicle is turned ON, and for displaying the vehicle owner information and the operation ending message when the operation switch for switching the power supply to said vehicle is turned OFF.

13. The motorcycle according to claim 12, said display apparatus further comprising inputting means for inputting the vehicle owner information.

14. The motorcycle according to claim 12, said display apparatus further comprising storage means for storing an emblem identifying said vehicle, said display means displaying the emblem before the vehicle owner information and the operation starting message are displayed.

15. The motorcycle according to claim 13, said display apparatus further comprising storage means for storing an emblem identifying said vehicle, said display means displaying the emblem before the vehicle owner information and the operation starting message are displayed.

16. The motorcycle according to claim 12, said display apparatus further comprising means for setting whether or not each of the displays should be performed, said means for setting whether or not each of the displays should be performed being arbitrarily selectable.

17. The motorcycle according to claim 13, said display apparatus further comprising means for setting whether or not each of the displays should be performed, said means for setting whether or not each of the displays should be performed being arbitrarily selectable.

18. The motorcycle according to claim 14, said display apparatus further comprising means for setting whether or not each of the displays should be performed, said means for setting whether or not each of the displays should be performed being arbitrarily selectable.

19. The display apparatus for a vehicle according to claim 15, further comprising means for setting whether or not each of the displays should be performed, said means for setting whether or not each of the displays should be performed being arbitrarily selectable.

20. The motorcycle according to claim 12, said display apparatus further comprising inputting means for inputting the vehicle owner information includes an inputting screen and is constructed so as to pass through a plurality of screen changing over steps in order to pass from an initial display screen, which is displayed when the power supply is switched on, to the inputting screen.

* * * * *